(12) United States Patent
Schoonover et al.

(10) Patent No.: US 9,321,209 B2
(45) Date of Patent: Apr. 26, 2016

(54) METHOD FOR MAKING MULTIPLE DUROMETER BULB SEALS

(71) Applicant: M&S Extrusions, Inc., Imlay, MI (US)

(72) Inventors: James Schoonover, Shelby Township, MI (US); Vince McNish, Fostoria, MI (US)

(73) Assignee: Vintech Industries, Inc., Imlay City, MI (US)

( * ) Notice: Subject to any disclaimer, the term of this patent is extended or adjusted under 35 U.S.C. 154(b) by 118 days.

(21) Appl. No.: 14/211,651

(22) Filed: Mar. 14, 2014

(65) Prior Publication Data

US 2014/0265051 A1 Sep. 18, 2014

Related U.S. Application Data

(60) Provisional application No. 61/793,400, filed on Mar. 15, 2013.

(51) Int. Cl.

| B29C 47/06 | (2006.01) |
|---|---|
| B29C 47/00 | (2006.01) |
| B29L 31/26 | (2006.01) |
| B29K 227/06 | (2006.01) |
| B29K 21/00 | (2006.01) |
| B29K 23/00 | (2006.01) |
| B29K 55/02 | (2006.01) |
| B29C 47/80 | (2006.01) |
| B29C 47/90 | (2006.01) |

(52) U.S. Cl.
CPC .............. *B29C 47/06* (2013.01); *B29C 47/0047* (2013.01); *B29C 47/003* (2013.01); *B29C 47/0004* (2013.01); *B29C 47/0066* (2013.01); *B29C 47/802* (2013.01); *B29C 47/905* (2013.01); *B29C 2793/0027* (2013.01); *B29K 2021/003* (2013.01); *B29K 2023/12* (2013.01); *B29K 2055/02* (2013.01); *B29K 2227/06* (2013.01); *B29L 2031/265* (2013.01)

(58) Field of Classification Search
None
See application file for complete search history.

(56) References Cited

U.S. PATENT DOCUMENTS

| 5,411,785 A * | 5/1995 | Cook ................... B29C 47/0004 428/122 |
|---|---|---|
| 5,788,901 A * | 8/1998 | Barnard .................. B29C 43/26 264/165 |
| 6,401,397 B2 * | 6/2002 | Klein ................... B60J 10/0042 49/475.1 |
| 2010/0117257 A1 * | 5/2010 | Schoonover ........ B29C 47/0021 264/136 |

* cited by examiner

*Primary Examiner* — Monica Huson
(74) *Attorney, Agent, or Firm* — Warn Partners, P.C.

(57) ABSTRACT

Method for making multiple durometer bulb seals includes cooling separately at least one structural member and at least one bulb portion of the bulb seal, which have different durometers and shapes. At least a first extrusion is drawn through a die of an extruder for forming a structural member profile and the extruded material is pulled by a first pulling device along a longitudinal axis to a first calibrator device and then through a first cooling tank to cool the structural member profile to a predetermined temperature. Cooling medium directly contacts the outer and inner surfaces of the first profile. The bulb portion is extruded and attached onto the cooled structural member and pulled downstream to a second calibrator device and through a second cooling tank to cool the profile a predetermined amount. Disparity in cooling expansion and cooling differential between the multiple durometers and shapes is avoided or overcome.

19 Claims, 2 Drawing Sheets

METHOD FOR MAKING MULTIPLE DUROMETER BULB SEALS

CROSS-REFERENCE TO RELATED APPLICATIONS

This application claims the benefit of U.S. Provisional Application No. 61/793,400, filed Mar. 15, 2013. The disclosure of the above application is incorporated herein by reference

FIELD OF THE INVENTION

The present invention is directed to a process for manufacture of a weather strip which is used for attachment to a vehicle for providing a seal.

BACKGROUND OF THE INVENTION

Resilient bulb seals and trims are generally known and are commonly used for automobile window, trunk, and/or door sealing and trimming and are often placed along the abutting edges of parts. Another one of such applications is found in the field of mobile living quarters having extendable or slide-out rooms for providing a seal between the body panel of the recreational vehicle and the extendable room frame. A bulb seal is commonly placed along the interface between the abutting surfaces of parts to prevent water, debris, and excessive air drafts from entering the interior of the automobile and/or mobile living quarters from the outside. This seal often includes at least two sub-parts, a bulb portion and a structural member, each generally extending along a side of an opening of the motor vehicle. The structural member comprising a mounting portion is typically placed along the edge of the motor vehicle part to mount the seal to the part, and the bulb portion extends therefrom to form a resilient seal between the abutting edges of the motor vehicle parts around the outside edge of the opening. Optionally, at least one flange seal can additionally be used adjacent the opening so as to provide contact for additional interface between various surfaces of parts to prevent water, debris, and excessive air drafts from entering, e.g., placed along the edge of the sidewall and flexibly protrudes against the adjacent sidewall of the slide-out room so as to be in constant contact with the sidewall at all positions of the room between its open and closed positions.

Generally, using materials with different durometers is desirable for providing the respective mounting and sealing functions. Typically, the mounting portion has a greater stiffness and higher durometer than the bulb portion for installation and providing structural strength to help prevent the bulb seal from disengaging from the part edge and falling off.

Bulb seals are conventionally made by a co-extrusion process where the mounting portion and bulb portion are co-extruded forming an extruded strip of continuous length. This extruded strip is then delivered to a bath or trough containing cooled water to cool the extrusion. After passing through the bath the strip is usually trimmed and then cut into a desired length to form the finished bulb seal. One of the problems with this type of conventional process for making bulb seals is that due to the different durometers and the pre-cut length of continuous extruded material the mounting portion and bulb portion have different cooling rates. The continuous pre-cut extrusion strip prevents the cool water from entering the inside length of the bulb since there is no open end until after the seals are cut to their desired length after exiting the trough, thus, the bulb portion cannot additionally be effectively cooled from the inside. However, the mounting portion typically not only has a different material and higher durometer with a different cooling rate than the bulb portion, but also, unlike the bulb portion, does allow the cool water to enter the inside mounting portion due to its typical C or U-like shape. The resultant cooling differentials adversely affect part dimensions, tolerances, part integrity, and other material and structural properties of the finished bulb seal. Another typical problem caused by the differential cooling and deficient conventional processing is that the legs or walls of the mounting portion become curved, wavy, scratched, and/or otherwise compromised. Typical co-extrusion dies and processing steps have attempted unsuccessfully to overcompensate for the problem of uneven cooling and/or cooling cycle time variations additionally causing further processing issues, complexity, perpetual adjustments, e.g., equipment speed adjustment, and additional costs.

Therefore, it is desirable to have a method for making multiple durometer bulb seals that helps to avoid or overcome the disparity in the cooling expansion and cooling differential between the multiple durometers. It is also desirable to have improved quality multiple durometer bulb seals without adversely affecting or compromising their rigid carriers or mounting portion and tolerances.

SUMMARY OF THE INVENTION

The present invention is directed to a method for making multiple durometer bulb seals usable for attachment to motor vehicles. Generally, the method for making multiple durometer bulb seals includes forming at least a structural member and at least one bulb portion coupled thereto. The method comprises providing at least one first main extruder, at least one secondary extruder, at least one first calibrator device, at least one first cooling tank, and at least one first pulling device, to form the at least one structural member and provide a cooling medium flow thereto. The method further comprises additionally providing at least one downstream extruder, at least one secondary downstream extruder, at least one second calibrator device, at least one second cooling tank, and at least one second pulling device, located downstream from said at least one first pulling device and upstream from at least one cutting device, to form the at least one bulb portion and provide a cooling medium flow thereto. Preferably, the method is performed with in-line processing steps upstream to downstream arranged generally along the longitudinal axis with pulled material moving in a forward direction toward the at least one cutting device. The present invention helps to avoid or overcome the disparity in the cooling expansion and cooling differential between the multiple durometers of the bulb seal, e.g., between the durometer of the structural member and the durometer of the bulb portion, by cooling separately the at least one structural member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
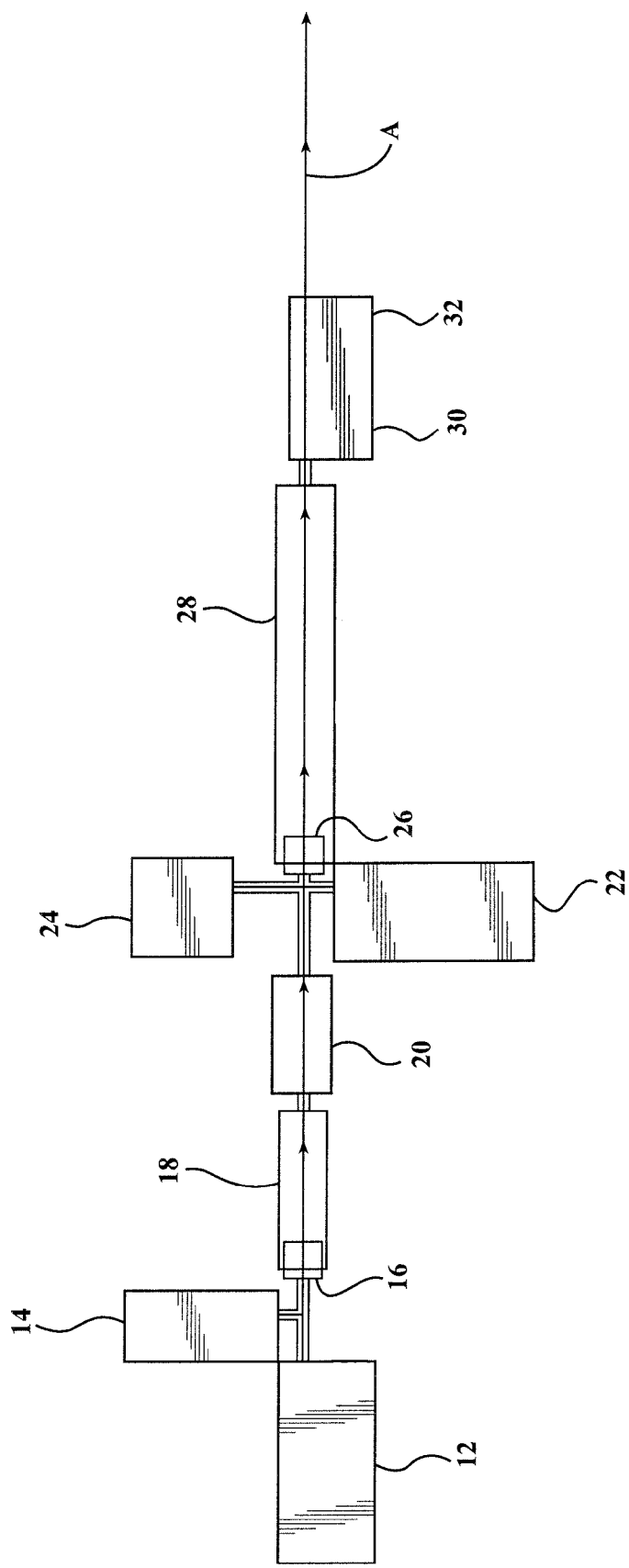
FIG. 1 is a schematic illustration depicting the process for making multiple diameter bulb seals, according to the present invention.
Figure 2:
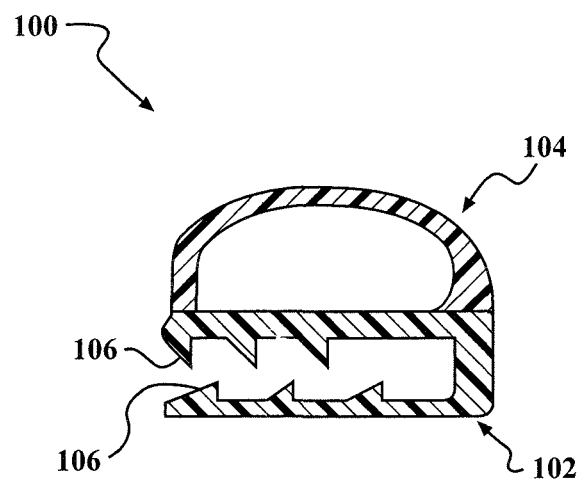
FIG. 2 is a front elevation view of a multiple durometer bulb seal, in accordance with the present invention.
Figure 3:
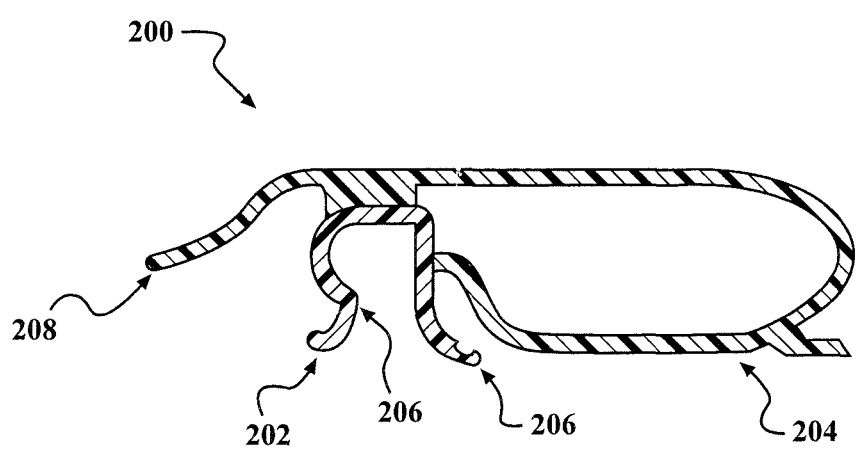
FIG. 3 is a front elevation view of a multiple durometer bulb seal, in accordance with the present invention.

Referring to FIGS. 1-3 generally, the method for making multiple durometer bulb seals in accordance with the present invention comprises providing an upstream to downstream arrangement comprising at least one first main extruder 12, at least one secondary extruder 14, at least one first calibrator device 16, at least one first cooling tank 18, at least one first pulling device 20, and at least one cutting device 32. Typically, the method is performed with in-line processing steps arranged generally along a longitudinal axis A.

The method further comprises additionally providing at least one downstream extruder 22, at least one secondary downstream extruder 24, at least one second calibrator device 26, at least one second cooling tank 28, and at least one second pulling device 30, located upstream to the at least one cutting device 32. Preferably, the method is performed with in-line processing steps upstream to downstream arranged generally along the longitudinal axis A with pulled material moving in a forward direction toward the at least one cutting device 32, as indicated generally by the arrows along axis A in FIG. 1.

FIG. 2 depicts a bulb seal of the present invention, generally shown at 100 comprising a structural member, generally shown at 102, and a bulb portion, generally shown at 104, manufactured in accordance with the method of the present invention. The structural member 102 is generally U-shaped for mounting to a component therein and can further optionally comprise a plurality of retention members 106 for receiving mounting features of the motor vehicle part edge or flange. The retention members 106 can comprise opposing offset and angled barbs, protrusions, and the like for gripping mounting features of the motor vehicle component edge or flange. The bulb portion 104 is extruded onto the structural member 102 such that a sealing function is provided by the bulb portion 104 in contact with a motor vehicle surface relative to an opening to help prevent moisture and debris from entering through the motor vehicle opening. The structural member 102 has a higher durometer than the bulb portion 104.

FIG. 3 depicts a bulb seal, generally shown at 200 comprising a structural member, generally shown at 202, and a bulb portion, generally shown at 204. The structural member 202 is generally C-shaped or U-shaped for mounting to a motor vehicle part therein and comprises retention members, generally shown at 206, for receiving and retaining mounting features of the motor vehicle part edge or flange. The bulb portion 204 is extruded onto a first side and/or outer surface of the structural member 202 such that a sealing function is provided by the bulb portion 204 in contact with a motor vehicle surface relative to an opening to help prevent moisture and debris from entering through the opening. Additionally, at least one flange seal, generally shown at 208, is extruded onto a second side and/or top surface of the retention member 202 and extends away from the bulb portion 204 to provide a second sealing function.

The structural member 202 has a higher durometer than the bulb portion 204 and flange seal 208. Most preferably, the structural member 202 has a higher durometer than at least the bulb portion 204. Alternatively, the bulb portion 204 can additionally have a lower durometer than the flange seal 208. One application of the bulb seal 200 is found in the field of mobile living quarters having slide-out rooms. The flange seal 208 can be in sliding contact with one of the sidewalls thereof and is made of a material which is rigid enough to ensure that the flange seal 208 remains in contact with the side wall of the slide-out room as the slide-out room is extended or retracted.

It is within the contemplation of the invention that the bulb portion 204 and flange seal 208 can generally have the same durometer. It is also understood that alternative extruded structural member and bulb portion arrangements suitable for mounting and sealing may be used, in particular, suitable shapes and configuration for providing a channeled structural mounting feature and a bulb sealing configuration including a lower durometer than the structural member.

Generally, the extruded materials can be polypropylene, thermoplastic elastomer, soft TPE (Thermoplastic Elastomer), rigid PVC, flexible PVC, PVC vinyl, PVC rubber, ABS. Typically, the support member 102,202 is made from a structural ABS (Acrylonitrile Butadiene Styrene), polypropylene, or other plastic material suitable for providing a rigid structural member in accordance with the present invention. Typically, the bulb portion 104,204 is made from TPE, and optionally, co-extruded slip coated or other plastic material suitable for providing a resilient seal. Preferably, the extruded materials are compatible material to melt bond to one another under pressure.

Referring to the Figures generally, in more particularly to FIG. 1, the first main extruder 12 heats a first material, preferably of a higher durometer operable to provide structural support to a U or C-like channel for mounting. Generally, the first material can be heated to about 315 to 420° C. Preferably, to about 315 to 350° C. Most preferably, to about 370 to 420° C. The extrusion is then drawn through a die of the extruder for forming the structural member profile, e.g., with the U-shaped channel, and the extruded material is pulled by the first pulling device 20 along the longitudinal axis A to the first calibrator device 16. The first calibrator device 16, which is most preferably a vacuum calibrator coupled to the first cooling tank 18, forms the final profile of the structural member 102,202. Preferably, the structural member has a final U-shaped-like profile with at least one retention member 106,206, more preferably, a plurality of retention members.

Optionally, a secondary extruder 14 adjacent to the first extruder 12 can be used to co-extrude a second extrusion, e.g., having the same and/or lower durometer than the first extrusion, for melt bonding a second profiled extrusion onto the first extrusion substantially immediately upon exiting the first extruder 12, or substantially contemporaneous with the first extrusion, and prior to the first calibrator device 16 where the final profiled shape is formed, e.g., profile comprising a U-shaped structural member with a melt bonded segment extending therefrom and/or a slip coating thereon. By way of non-limiting example, the at least one retention member 106, 206 can be formed onto the structural member 102,202 by the secondary extruder 14. It is understood that, alternatively, the at least one retention member 106,206 can be formed, and pressure and heat bonded downstream by the downstream extruder 22 or secondary downstream extruder 24.

After exiting the first calibrator device 16 the extruded structural member has the desired final profile(s). However, the material is still heated and therefore pliable or otherwise susceptible to deformation until it is cooled a desirable amount.

To cool and set in the desired profile of the structural member, and any secondary features melt bonded thereto and/or slip coating, as the extrusion is pulled through the calibrator 16, it is immediately drawn through the at least one first tank 18 containing a cooling medium, preferably cooled water, by the first pulling device 20. The cooling medium can directly contact the walls on the outer and inner surfaces of the first extrusion profile. Generally, the first tank 18 cools the extrusion an optimum amount suitable for maintaining the final profile of the structural member 102,202, e.g., U-shaped profile. Preferably, the first tank 18 cools the extrusion to about 80 to 100° C. to set in the profile. Thus, the first calibrator device 16 in combination with the cooling bath of the at least one first tank 18 substantially locks in the final profile of the first extrusion.

In the next step of the method for making multiple durometer bulb seals, the at least one downstream extruder 22 heats a second material, preferably of a lower durometer operable to provide the bulb portion 104,204. Generally, the second material can be heated to about 315 to 420° C. Preferably, to about 315 to 350° C. More preferably, to about 370 to 420° C. It is understood that the heating of the second material is done simultaneous with the heating of the first material in the first main extruder 12 or staggered a predetermined amount of time suitable to provide uninterrupted or non-delayed heating and processing in the manufacture of the multiple durometer bulb seal. After the cooled extrusion exits the at least one first tank 18 and is pulled along the first pulling device 20, the first extrusion is then drawn through, most preferably, pulled directly adjacent to the downstream extruder 22, by the second pulling device 30. The downstream extruder 22 comprises a mandrel and a die to extrude and attach at least one bulb portion 104,204 onto the cooled structural member 102, 202, e.g., attach melt bond points under pressure, as the extrusion continues to move downstream along the longitudinal axis A.

Optionally, at least one secondary downstream extruder 24 adjacent to the downstream extruder 22 can be used to co-extrude at least one addition bulb portion, and/or another extrusion such as the flange seal 208, and/or at least one retention member 106,206, and/or for melt bonding another alternative profiled extrusion onto to the structural member 102,202, and/or co-extruded slip coating of at least the bulb portion 104,204. The secondary downstream extruder 24 bonds an extrusion onto the structural member 102,202 and/ or bulb portion 104,204 substantially immediately upon exiting the downstream extruder 22, or contemporaneously with the downstream extruder 22, and prior to the second calibrator device 26 where the final profiled shape is formed.

The extrusion is then pulled by the second pulling device 30 along the longitudinal axis A to the at least one second calibrator device 26. The second calibrator device 26, which is preferably a vacuum calibrator operably coupled to the second cooling tank 28, forms the final profile of the at least one bulb portion 104,204. Preferably, the at least one bulb portion 104,204 has a final closed bulb profile.

After exiting the second calibrator device 28 the extruded structural member has the desired final profiles of the bulb seal 100,200. However, the material extruded onto the structural member 102,202, e.g., the bulb portion 104,204 and any flange 208, is still heated and therefore pliable or otherwise susceptible to deformation until it too is cooled a desirable amount.

To cool and set in the desired profile of the bulb seal 100,200, as the extrusion is pulled through the calibrator 26, it is then immediately drawn through the at least one second tank 28 containing a cooling medium, preferably cooled water, by the pulling device 30. Generally, the second tank 28 cools the extrusion an optimum amount suitable for maintaining the final profile of the bulb seal 100,200. Preferably, the second tank 28 cools the extrusion to about 80 to 100° C. to set in the profile. Thus, the second calibrator device 26 in combination with the cooling bath of the at least one second tank 28 substantially locks in the final profile of the first extrusion. The rearward and forward wall of the at least one first and second tank 20,28 have a centrally located recess cut out of the wall for guiding the extrusion through the tank at a desired height and preventing an undesired amount of lateral movement of the extrusion therein.

After the cooled bulb seal 100,200 exits the at least one second tank 28 and is pulled along the second pulling device 30, the cutting device 32 cuts the bulb seal 100,200. The cutting device 32 cuts the bulb seal 100,200 extrusion to a predetermined desired length for the final bulb seal 100,200 product, e.g., cut to length for a window weatherstrip. Preferably, the method provides an in-line arrangement for performing in-line processing steps with pulled material moving in a forward direction toward this at least one cutting device 32.

Most preferably, the first pulling device 20 and/or second pulling device 32 each has at least two rotating belt devices that receive the extruded material therebetween. Both of the rotating belt devices rotate around an elongated hub parallel to the longitudinal axis. Both of the rotating belt devices has at least one, most preferably at least two, cylindrical hubs coupled to a motor for rotation about an axis transverse to the longitudinal axis A, which causes the belt to rotate thereby pulling the extruded material downstream frictionally engaged between the at least two rotating belt devices. Optionally, a cylindrical rotating device for rotating to pull the extruded material directly resting thereon along the longitudinal axis A is additionally contemplated. Typically, the first pulling device 20 and/or second pulling device 32 are pullers or "haul offs", preferably, RDN, Gatto, Ferris or Novatec machines.

With respect to the multiple durometers used, the harder durometer material is, generally, about 40-70 Shore D, and, preferably, about 50 to 70 Shore D. The softer durometer materials are generally, about 35-85 Shore A, and, preferably about 55-65 Shore A.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A method for making bulb seals, comprising
providing at least one first main extruder;
providing at least one first calibrator device, said at least one first calibrator device is a vacuum calibrator;
providing at least one first cooling tank;
providing at least one first pulling device
providing at least one downstream extruder;
providing at least one second calibrator device;
providing at least one second cooling tank;
providing at least one second pulling device;
extruding a first material, said first main extruder forming a structural member;
pulling said structural member using said first pulling device through said first calibrator device, said first calibrator device forming a final profile of said structural member;
cooling said structural member in a cooling medium located in said first cooling tank to about 80 to 100° C.;

extruding a second material with said at least one downstream extruder to form a bulb portion, said second material having a different durometer than said first material;

bonding said bulb portion to said structural member;

pulling said structural member and bulb portion using said second pulling device through said second calibrator device, said second calibrator device forming a final profile of said bulb portion;

pulling said structural member and bulb portion using said second pulling device through said second cooling tank;

cooling said bulb portion in a cooling medium located in said second cooling tank to about 80 to 100° C.; and cutting said structural member and bulb portion to provide bulb seals having a predetermined length.

2. The method for making bulb seals of claim 1, wherein bonding said bulb portion to said structural member further comprises melt bonding to one another under pressure.

3. The method for making bulb seals of claim 1, wherein the first material has a higher durometer than the second material, said higher durometer being about 40-70 Shore D.

4. The method for making bulb seals of claim 1, further comprising,
providing at least one secondary extruder located adjacent to said at least one first extruder;
co-extruding a second extrusion and/or slip coating at the same time as said at least one first extruder;
melt bonding said second extrusion and/or slip coating onto said structural member;
wherein said structural member and said second extrusion and/or slip coating are cooled in said cooling medium of said at least one first cooling tank.

5. The method for making bulb seals of claim 1, further comprising,
providing at least one secondary downstream extruder located adjacent to said at least one downstream extruder;
co-extruding a second extrusion and/or slip coating;
melt bonding said second extrusion and/or slip coating onto said bulb portion and/or structural member;
wherein said structural member, bulb portion, and said second extrusion and/or slip coating are cooled in said cooling medium of said at least one second cooling tank.

6. The method for making bulb seals of claim 5, wherein said second extrusion is a flange.

7. The method for making bulb seals of claim 1, further comprising first heating said first material and said second material respectively in said at least one first extruder and downstream extruder to about 315 to 420° C.

8. The method for making bulb seals of claim 1, further comprising providing at least one cutting device to cut said bulb seals to a predetermined length.

9. The method for making bulb seals of claim 1, wherein said at least one first main extruder, at least one first calibrator device, at least one first cooling tank, at least one first pulling device, at least one downstream extruder, at least one second calibrator device, at least one second cooling tank, and at least one second pulling device have an in-line arrangement.

10. The method for making bulb seals of claim 1, wherein said first material is structural Acrylonitrile Butadiene Styrene (ABS) or polypropylene.

11. The method for making bulb seals of claim 1, wherein said second material is Thermoplastic Elastomer (TPE).

12. A method for making multiple durometer bulb seals, comprising
providing a first material;
providing a second material having a lower durometer than said first material;
providing at least one first main extruder;
providing at least one first calibrator device located in-line and downstream from said first main extruder, said at least one first calibrator device is a vacuum calibrator;
providing at least one first cooling tank located in-line and downstream from said first calibrator device;
providing at least one first pulling device located in-line and downstream from said first cooling tank for pulling an extrusion along a longitudinal axis;
providing at least one downstream extruder located in-line and downstream from said first pulling device;
providing at least one second calibrator device located in-line and downstream from said downstream extruder;
providing at least one second cooling tank located in-line and downstream from said second calibrator;
providing at least one second pulling device located in-line and downstream from said second cooling tank for pulling said extrusion along said longitudinal axis;
providing at least one cutting device located in-line and downstream from said second pulling device;
heating a first material to about 315 to 420° C. in said at least one first main extruder;
extruding said first material for forming a structural member;
pulling said structural member using said first pulling device through said first calibrator device, said first calibrator device forming a final profile of said structural member;
cooling said structural member in a cooling medium located in said first cooling tank to about 80 to 100° C., said cooling medium contacting outer and inner surfaces of said structural member;
extruding said second material with said at least one downstream extruder to form a bulb portion;
bonding said bulb portion to said structural member;
pulling said structural member and bulb portion using said second pulling device through said second calibrator device, said second calibrator device forming a final profile of said bulb portion;
pulling said structural member and bulb portion using said second pulling device through said second cooling tank;
cooling said bulb portion in a cooling medium located in said second cooling tank to about 80 to 100° C.; and
cutting said structural member and bulb portion to provide bulb seals having a predetermined length.

13. The method for making bulb seals of claim 12, wherein bonding said bulb portion to said structural member further comprises melt bonding to one another under pressure.

14. The method for making bulb seals of claim 12, further comprising,
providing at least one secondary extruder located adjacent to said at least one first extruder;
co-extruding a second extrusion and/or slip coating of said first material or a third material with said at least one first extruder;
melt bonding said second extrusion and/or slip coating onto said structural member;
wherein said structural member and said second extrusion and/or slip coating are cooled in said cooling medium of said at least one first cooling tank.

15. The method for making bulb seals of claim 12, further comprising,
providing at least one secondary downstream extruder located adjacent to said at least one downstream extruder;

co-extruding a second extrusion and/or slip coating;

melt bonding said second extrusion and/or slip coating onto said bulb portion and/or structural member;

wherein said structural member, bulb portion, and said second extrusion and/or slip coating are cooled in said cooling medium of said at least one second cooling tank.

16. The method for making bulb seals of claim 15, wherein said second extrusion is a flange.

17. The method for making bulb seals of claim 12, wherein said first material and/or second material is selected from the group consisting of polypropylene, thermoplastic elastomer, soft TPE (Thermoplastic Elastomer), rigid PVC, flexible PVC, PVC vinyl, PVC rubber, and structural Acrylonitrile Butadiene Styrene (ABS).

18. The method for making bulb seals of claim 12, wherein said first material and second material melt bond to one another under pressure.

19. A method for making multiple durometer bulb seals, comprising providing a first material for forming a structural member having a first durometer of about 40-70 Shore D;

providing a second material for forming a bulb portion having a durometer of about 35-85 Shore A;

providing at least one first main extruder;

providing at least one first calibrator device located in-line and downstream from said first main extruder, said at least one first calibrator device is a vacuum calibrator;

providing at least one first cooling tank located in-line and downstream from said first calibrator device;

providing at least one first pulling device located in-line and downstream from said first cooling tank for pulling an extrusion along a longitudinal axis;

providing at least one downstream extruder located in-line and downstream from said first pulling device;

providing at least one second calibrator device located in-line and downstream from said downstream extruder;

providing at least one second cooling tank located in-line and downstream from said second calibrator;

providing at least one second pulling device located in-line and downstream from said second cooling tank for pulling said extrusion along said longitudinal axis;

providing at least one cutting device located in-line and downstream from said second pulling device;

heating a first material to about 315 to 420° C. in said at least one first main extruder;

co-extruding said first material for forming said structural member;

pulling said structural member using said first pulling device through said first calibrator device, said first calibrator device forming a final profile of said structural member;

cooling said structural member in a cooling medium located in said first cooling tank to about 80 to 100° C., said cooling medium contacting outer and inner surfaces of said structural member;

extruding said second material with said at least one downstream extruder to form said bulb portion;

melt bonding said bulb portion to said structural member;

pulling said structural member and bulb portion using said second pulling device through said second calibrator device, said second calibrator device forming a final profile of said bulb portion;

pulling said structural member and bulb portion using said second pulling device through said second cooling tank;

cooling said bulb portion in a cooling medium located in said second cooling tank to about 80 to 100° C.; and cutting said structural member and bulb portion to provide bulb seals having a predetermined length;

wherein said structural member and bulb portion are not co-extruded;

wherein said at least one first main extruder, at least one first calibrator device, at least one first cooling tank, at least one first pulling device, at least one downstream extruder, at least one second calibrator device, at least one second cooling tank, at least one second pulling device, and at least one cutting device have an in-line arrangement of features along a longitudinal axis; and wherein said in-line arrangement of features and separate cooling of said structural member and said bulb portion in said method for making multiple durometer bulb seals avoids or overcomes or diminishes a predetermined disparity in cooling expansion and cooling differentials between said different durometers.

* * * * *